(12) United States Patent  
Matsuura

(10) Patent No.: US 6,751,803 B1
(45) Date of Patent: Jun. 15, 2004

(54) SIGNAL DISTRIBUTION CIRCUIT

(75) Inventor: Syuuji Matsuura, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/576,995

(22) Filed: May 24, 2000

(30) Foreign Application Priority Data

May 24, 1999 (JP) .......................................... 11-142663

(51) Int. Cl.[7] .............................. H04N 7/16; H04N 5/44
(52) U.S. Cl. ..................... 725/127; 725/128; 725/68; 725/100; 725/139; 725/149; 725/151; 348/725
(58) Field of Search ................................ 725/127, 128, 725/131, 133, 139, 140, 151, 152, 132, 100, 89, 60; 348/725, 726

(56) References Cited

U.S. PATENT DOCUMENTS

| 5,311,325 | A | | 5/1994 | Edwards et al. | |
|---|---|---|---|---|---|
| 5,361,394 | A | * | 11/1994 | Shigihara | 725/131 |
| 5,574,964 | A | * | 11/1996 | Hamlin | 725/78 |
| 5,606,725 | A | * | 2/1997 | Hart | 725/131 |
| 5,815,794 | A | * | 9/1998 | Williams | 725/125 |
| 5,826,167 | A | * | 10/1998 | Jelinek et al. | 725/121 |
| 5,835,844 | A | * | 11/1998 | Stoneback et al. | 725/125 |
| 5,870,513 | A | * | 2/1999 | Williams | 385/24 |
| 5,901,340 | A | * | 5/1999 | Flickinger et al. | 725/149 |
| 5,956,075 | A | * | 9/1999 | Matsuo | 725/131 |
| 5,956,098 | A | * | 9/1999 | Mizukami et al. | 348/735 |
| 6,049,693 | A | * | 4/2000 | Baran et al. | 725/124 |
| 6,091,301 | A | * | 7/2000 | Vogt | 330/278 |
| 6,188,397 | B1 | * | 2/2001 | Humpleman | 725/80 |
| 6,363,262 | B1 | * | 3/2002 | McNicol | 455/561 |
| 6,530,088 | B1 | * | 3/2003 | Brickell et al. | 725/127 |

FOREIGN PATENT DOCUMENTS

| JP | 5064197 A | 3/1993 |
|---|---|---|
| JP | 5161140 A | 6/1993 |
| JP | 5191807 A | 7/1993 |
| JP | 6 121294 A | 4/1994 |
| JP | 6253276 A | 9/1994 |

* cited by examiner

Primary Examiner—John Miller
Assistant Examiner—Annan Q. Shang
(74) Attorney, Agent, or Firm—Birch, Stewart, Kolasch & Birch, LLP

(57) ABSTRACT

Received digital CATV signals are branched by a directional coupler into signals flowing in a through direction and signals flowing in a branch direction. The signals output from the directional coupler in the through direction are then fed through an extraction circuit, a variable attenuator, and a wide-band amplifier so as to have a desired frequency range and a desired level, and are then fed to a distributor so as to be distributed, for output, into downstream signals to be fed to a downstream tuner and CATV signals to be fed to an analog/digital tuner. The signals output from the directional coupler in the branch direction are fed through a band-pass filter and a wide-band amplifier to a distributor so as to be distributed, for output, into VHF signals and FM signals. Upstream signals are fed through an extraction circuit to a terminal at which the CATV signals are received.

15 Claims, 9 Drawing Sheets

SIGNAL DISTRIBUTION CIRCUIT

BACKGROUND OF THE INVENTION

1. Field of the Invention

The present invention relates to a signal distribution circuit for use in a converter for receiving cable television broadcast (hereafter referred to as a "CATV" converter").

2. Description of the Prior Art

Conventionally, a CATV converter is used to permit a subscriber to view a desired program by selecting one among about 60 cable television broadcast signals (hereafter referred to as "CATV signals") that are transferred across a coaxial cable in a frequency range of, for example, 70 to 450 MHz (in the case of Japan). Such a CATV converter is installed on that end of the coaxial cable that leads to a television receiver of each subscriber.

In recent years, such a CATV converter has come to have enhanced functions that allow it to be connected to a videotape recorder for timer-recording, a second CATV converter for a second television receiver, an FM tuner, and the like. To achieve this, a modern CATV converter is additionally provided with output terminals for connection to a videotape recorder, a second CATV converter, an FM tuner, and the like, and also with a signal distribution circuit for distributing CATV signals among those output terminals.

Specifically, a CATV converter is configured as shown in FIG. 14. Reference numeral 31 represents a CATV signal input terminal at which the CATV converter receives the CATV signals transferred thereto across a cable. Reference numeral 32 represents a brancher (directional coupler) for branching the CATV signals received at the CATV signal input terminal 31 into signals that flow in a through direction and signals that flow in a branch direction. The signals output from the brancher 32 in the through direction are fed, on the one hand, to a CATV signal output terminal 40 for connection to an analog tuner, and, on the other hand, through a BPF (band-pass filter) 33 having a bandwidth of 70–75 MHz or 70–130 MHz that extracts, from those signals, downstream signals consisting of FSK (frequency-shift keying) signals having that band width, to a downstream signal output terminal 41 for connection to a tuner for receiving downstream signal.

The signals output from the brancher 32 in the branch direction are fed, through a variable attenuator 34 designed as, for example, an attenuator employing PIN diodes, then through two-stage wide-band amplifiers 35 and 36, to a distributor 37 that distributes the signals into two groups of signals. Here, the gain of the variable attenuator 34 is controlled by a gain control voltage that is applied to a control terminal (not shown) thereof. One of the two groups of signals output from the distributor 37 is fed to an extractor 38 composed of a band-pass filter that extracts VHF signals. The extracted VHF signals are, together with the UHF signals extracted by an extractor 39 composed of a band-pass filter from the signals fed in via a UHF signal input terminal 43, to a UHF/VHF signal output terminal 42 for connection to a UHF or VHF tuner of a television receiver. The other of the outputs from the distributor 37 is fed to an FM signal output terminal 44 for connection to an FM receiver. In this conventional example, a second CATV converter may also be connected to the output terminal 44.

The conventional example shown in FIG. 14 and described above is an example of a signal distribution circuit used in an analog STP (set-top box). In the case of a signal distribution circuit used in a digital STP, since it is connected to, as the succeeding stage, an analog/digital tuner and to a tuner for downstream signal reception, the signals are, before being fed to them, distributed into two groups of signals.

In a signal distribution circuit used in a conventional analog STB, much care is taken to transfer CATV signals with as small a loss as possible. To adapt this distribution circuit for digital-signal handling, it needs to be so configured as to permit an analog/digital tuner and a tuner for downstream signal reception to be connected thereto; specifically, an additional distributor needs to be provided after the band-pass filter 33 to distribute the signals into two groups of signals so that one of those outputs is fed to the downstream signal output terminal 41 and the other to a terminal (not shown) for connection to an analog/digital tuner. However, additionally providing this distributor causes a loss of 3 to 4 dB in the CATV signals, and thus degrades the C/N (carrier to noise) ratio. The distribution loss resulting from the insertion of this distributor can be compensated for by reducing the loss that is caused in the through direction by the brancher 32 provided in the preceding stage. However, reducing the loss caused in the through direction by this brancher 32 increases the loss in the branch direction, and thus degrades the NF (noise figure) of the signals that are extracted from the signals flowing in the branch direction so as to be fed to a television receiver and an FM receiver.

Moreover, a signal distribution circuit used in a digital STB allows a subscriber to transmit upstream signals from his part to the CATV central station via the CATV signal input terminal 31. However, no conventional technique is known to be ready for this function. At this CATV signal input terminal 31, upstream signals need to have a level of 120 dBuV.

SUMMARY OF THE INVENTION

An object of the present invention is to provide a signal distribution circuit that has a simple circuit configuration but nevertheless achieves efficient distribution of received digital CATV signals.

To achieve the above object, according to one aspect of the present invention, a signal distribution circuit is provided with: a directional coupler for distributing input CATV signals into signals that flow in a through direction and signals that flow in a branch direction; a first extraction circuit for permitting, out of the signals output from the directional coupler in the through direction, only signals having predetermined frequencies to pass therethrough; a variable attenuator for adjusting the level of the signals output from the first extraction circuit to a predetermined level; a wide-band amplifier for amplifying the signals output from the variable attenuator; a first output terminal for connection to an analog/digital tuner for receiving CATV signals; a second output terminal for connection to a tuner for receiving downstream signals; a first distributor for distributing the signals output from the wide-band amplifier to the first and second output terminals; a filter for permitting, out of the signals output from the directional coupler in the branch direction, only VHF signals and FM signals to pass therethrough; an amplifier for amplifying the signals output from the filter; and a second distributor for distributing the signals output from the amplifier into two groups of signals.

According to another aspect of the present invention, a signal distribution circuit is provided with: a CATV signal input terminal; a first extraction circuit for permitting, out of signals received at the CATV signal input terminal, only CATV signals to pass therethrough; a gain adjustment circuit for adjusting the level of the signals output from the first extraction circuit to a predetermined level; a wide-band amplifier for amplifying the signals output from the gain adjustment circuit; a first output terminal for connection to an analog/digital tuner for receiving CAIV signals; a second output terminal for connection to a tuner for receiving downstream signals; a first distributor for distributing the signals output from the wide-band amplifier into two groups of signals and feeding one of those two groups of signals to the first output terminal; a filter for permitting only VHF signals and FM signals to pass therethrough; a second distributor for distributing the other of the two groups of signals output from the first distributor to the second output terminal and the filter; a third output terminal; a fourth output terminal; and a third distributor for distributing the signals output from the filter to the third and fourth output terminals.

According to another aspect of the present invention, a signal distribution circuit is provided with: a CATV signal input terminal; a first extraction circuit for permitting, out of signals received at the CATV signal input terminal, only CATV signals to pass therethrough; a first output terminal for connection to an analog/digital tuner for receiving CATV signals; a second output terminal for connection to a tuner for receiving downstream signals; a first distributor for distributing the signals output from the first extraction circuit into two groups of signals; a first circuit for adjusting the gain of one of the groups of signals output from the first distributor and feeding those signals to the second output terminal; a second circuit for adjusting the gain of the other of the groups of signals output from the first distributor; a filter for permitting only VHF signals and FM signals to pass therethrough; a second distributor for distributing the signals output from the second circuit into two groups of signals and feeding one of those two groups of signals to the first output terminal and the other to the filter; a third output terminal; a fourth output terminal; and a third distributor for distributing the signals output from the filter to the third and fourth output terminals.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, embodiments of the present invention will be described with reference to the accompanying drawings.

Embodiment 1

Figure 1:
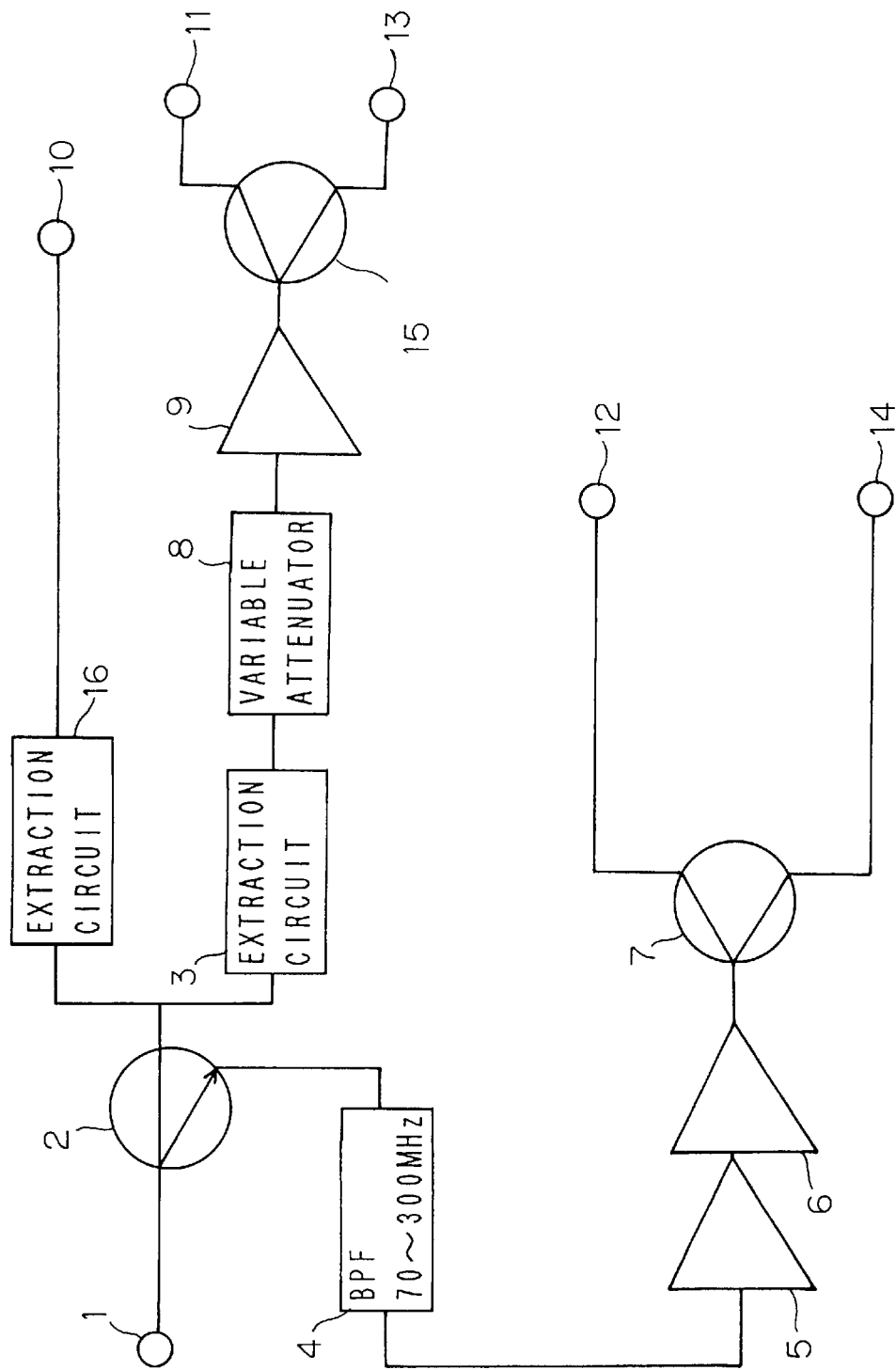
FIG. 1 is a block diagram of a first embodiment of the invention.
Figure 7:
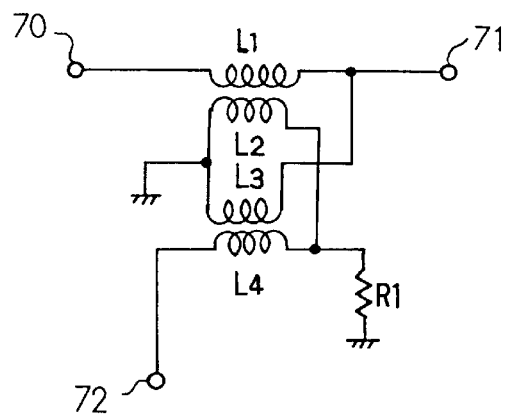
FIG. 7 is a circuit diagram of the brancher used in the first, second, third, and fifth embodiments.
Figure 10:
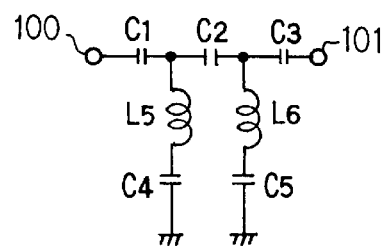
FIG. 10 is a circuit diagram of the high-pass filter used in the embodiments.
Figure 11:
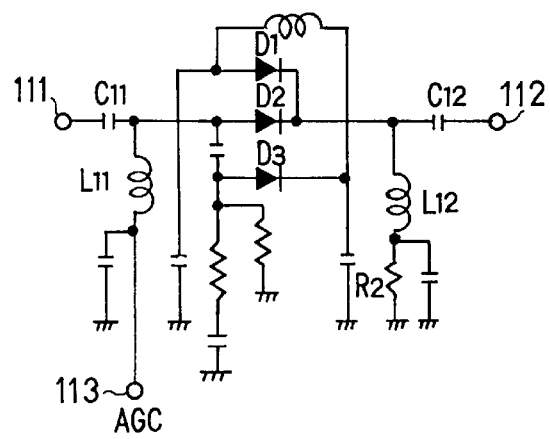
FIG. 11 is a circuit diagram of the variable attenuator used in the first, fourth, fifth, and sixth embodiments.
Figure 12A:
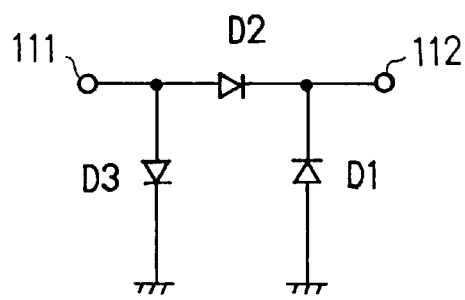
FIGS. 12A and 12B are circuit diagrams of a part of the circuit shown in FIG. 11 used in the embodiments.
Figure 12B:
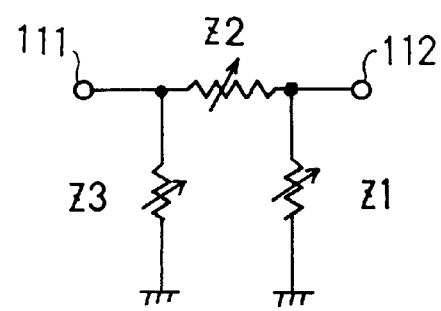

FIG. 1 is a block diagram of a first embodiment of the invention. In FIG. 1, reference numeral 1 represents a CATV signal input terminal for receiving CATV signals fed across a cable, and reference numeral 2 represents a brancher (directional coupler) for branching the CATV signals received at the CATV signal input terminal 1 into signals that flow in a through direction and signals that flow in a branch direction (indicated with an arrow in the figure). The brancher is composed of, for example as shown in FIG. 7, inductance coils L1, L2, L3, and L4 and a resistor R1 connected between an input terminal 70 and a first and a second output terminals 71 and 72. Whereas the loss occurring between the input terminal 70 and the first output terminal 71 is small, specifically −0.5 dB, the loss occurring between the input terminal 70 and the second output terminal 72 is large, specifically −10 dB. The direction of the signals that flow from the input terminal 70 to the first output terminal 71 is called the through direction, and the direction of the signals that flow from the input terminal 70 to the second output terminal 72 is called the branch direction. Back in FIG. 1, the signals output from the brancher 2 in the through direction are fed to an extraction circuit (duplexer) 3 composed of a HPF (high-pass filter) that removes unnecessary signal components from the signals so that only the CATV signals and the downstream signals are permitted to pass therethrough and fed to an analog/digital tuner and a downstream tuner. The high-pass filter is composed of, for example as shown in FIG. 10, capacitors C1–C5 and inductance coils L5–L6 connected between an input terminal 100 and an output terminal 101. The signals output from the extraction circuit 3 are fed to a variable attenuator 8 designed as a PIN attenuator and constituting an AGC circuit so as to be subjected to signal level adjustment. Here, the degree of attenuation effected by the variable attenuator 8 is adjusted by applying to the control terminal thereof a gain control voltage obtained as a negative feedback signal of the output voltage. A practical example of the variable attenuator is shown in FIG. 11. In this figure, reference numeral 111 represents its input terminal and reference numeral 112 represents its output terminal. Reference symbols C11 and C12 represent capacitors for eliminating a direct-current signal component. Reference symbols D1, D2, and D3 represent PIN diodes. The impedances of these PIN diodes D1–D3 vary according to an AGC voltage applied to a control terminal 113. FIG. 12A shows the PIN diodes D1–D3 extracted, and FIG. 12B shows the equivalent circuit thereof. As the voltage at the control terminal 113 becomes higher, the impedance Z2 of the diode D2 decreases and the impedances Z1 and Z3 of the diodes D1 and D3 increase; thus the degree of attenuation effected becomes lower. By contrast, as the voltage at the control terminal 113 becomes lower, the impedance Z2 of the diode D2 increases and the impedances Z1 and Z3 of the diodes D1 and D3 decrease; thus the degree of attenuation effected becomes higher.

Figure 13:
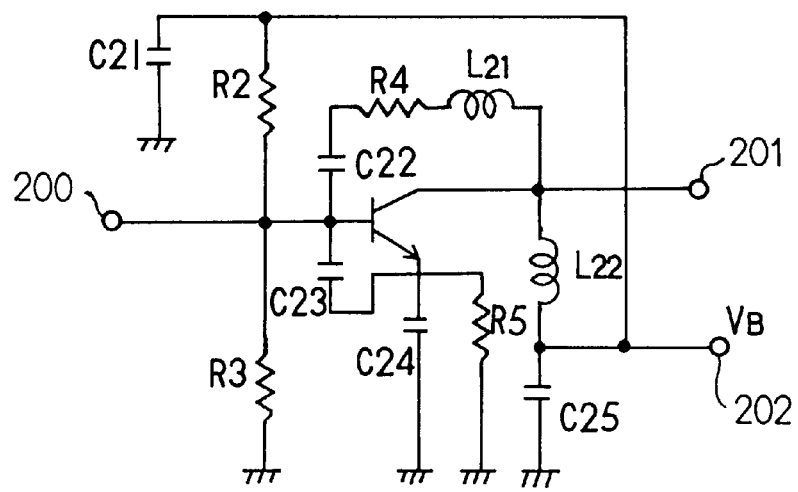
FIG. 13 is a circuit diagram of the wide-band amplifier used in the embodiments.
Figure 14:
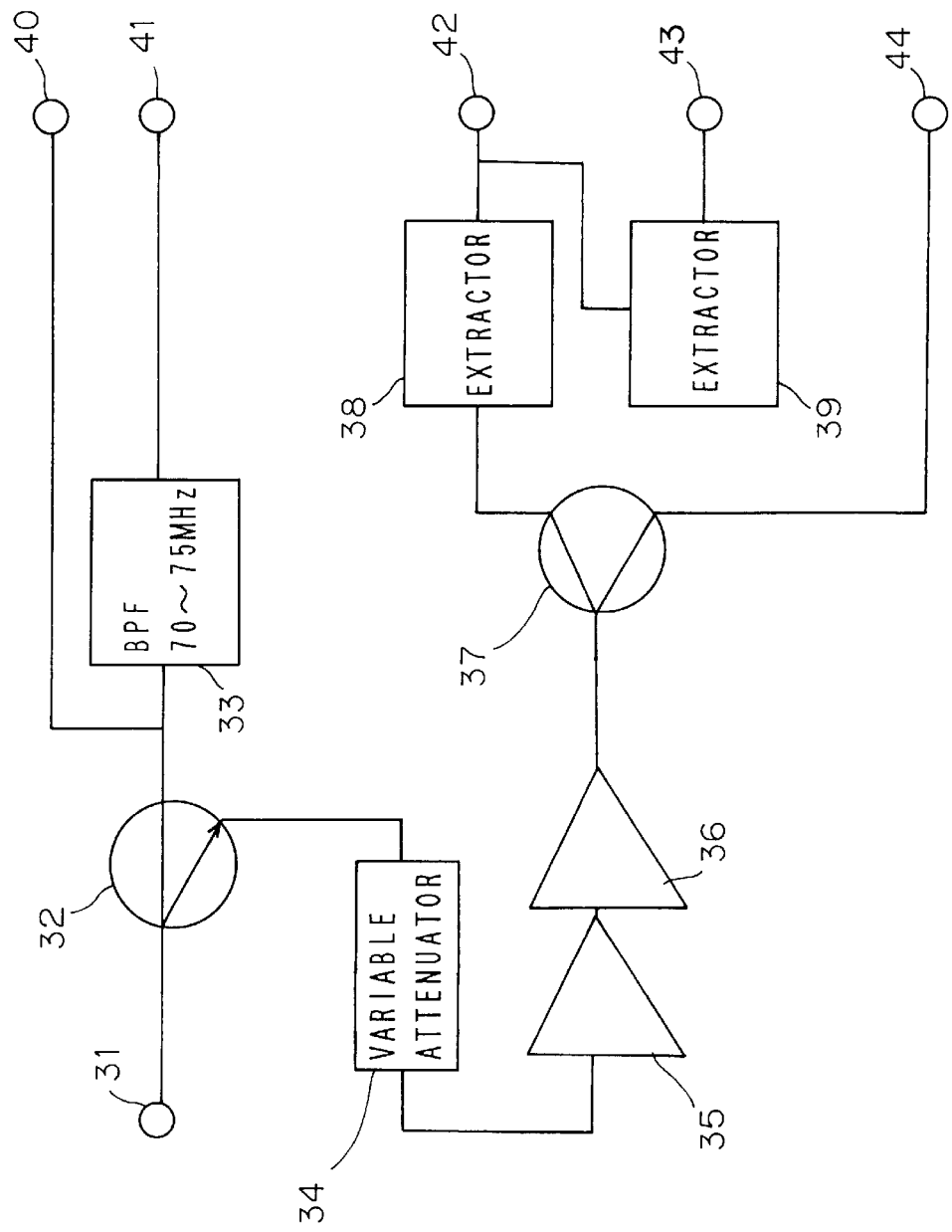
FIG. 14 is a block diagram of a conventional example.

The signals having subjected to signal level adjustment by the variable attenuator 8 are then amplified by a wide-band amplifier 9 provided in the succeeding stage, and are then fed to a distributor 15 so as to be distributed into two groups of signals. Of these two groups of signals, one is fed as CATV signals to a signal output terminal 11 so as to be fed to an analog/digital tuner, and the other is fed as downstream signals to a signal output terminal 13 so as to be fed to a tuner for downstream signal reception. To the output terminal 11, an analog/digital tuner (not shown) is connected; to the output terminal 13, a downstream tuner (not shown) is connected. A practical example of the wide-band amplifier is shown in FIG. 13. In this figure, reference numeral 200 represents its input terminal and reference numeral 201 represents its output terminal. Reference symbol Q represents an amplifying transistor of an NPN type. Reference symbols R2 and R3 represent resistors for dividing a direct-current voltage $V_B$ that is fed to a terminal 202 to supply a bias voltage to the base of the transistor Q. The AGC voltage may be superimposed on this voltage $V_B$. Moreover, capacitors C21–C25, inductance coils L21 and L22, and resistors R4 and R5 are connected as shown in the figure.

Figure 8:
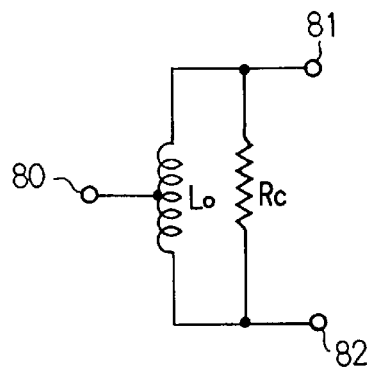
FIG. 8 is a circuit diagram of the distributor used in the embodiments.

In the signal distribution circuit described above, the distribution loss occurring in the distributor 15 causes considerably large losses in the CATV signals output to the CATV signal output terminal 11 and the downstream signals output to the data output terminal 13. However, the wide-band amplifier 9 provided in the stage preceding the distributor 15 compensates for the loss occurring in the distributor 15, and thereby improves the NF (noise figure). This helps improve the C/N of the signals output to the CATV signal output terminal 11 and the data output terminal 13. On the other hand, the insertion of the wide-band amplifier 9, due to its permissible input level, imposes a limit on the level of the input signals that can be handled, and thus causes distortion when the input signals are at the maximum permissible input level. The variable attenuator 8 is provided to solve this problem; it is provided in the stage preceding the wide-band amplifier 9 and acts as an AGC circuit that prevents the signals fed to the wide-band amplifier 9 from exceeding the permissible level. The distributor is composed of, for example as shown in FIG. 8, a coil $L_0$ and a resistor $R_0$ connected across it. The signals are fed from an input terminal 80 to a center tap of the coil, and are distributed into two groups of signals appearing at output terminals 81 and 82 connected to both ends of the coil. In this case, the signals appearing at each of the output terminals 81 and 82 have half their original level.

As described above, in this embodiment, the wide-band amplifier 9 is inserted in the stage preceding the distributor 15 to compensate for the distribution loss occurring in the distributor 15. As compared to a signal distribution circuit used in a conventional digital STB that can be realized simply by providing an additional distributor for separating the downstream signals from the CATV signals, this makes it possible to design the brancher (directional coupler) 2 to achieve a loss within −2 dB, as compared to within −1 dB achieved conventionally, in the through direction and a loss of −8 dB, as compared to −10 dB achieved conventionally, in the branch direction. Thus, it is possible to improve the NF of the VHF signals and FM signals fed to a VHF signal output terminal 12 and an FM signal output terminal 14.

The signals output from the brancher (directional coupler) 2 in the branch direction are fed to a band-pass filter 4 having a bandwidth of 70–300 MHz, which removes unnecessary signal components from the signals so that only VHF signals and FM signals are fed to wide-band amplifiers 5 and 6 provided in the succeeding stage so as to be amplified thereby. The signals amplified by the wide-band amplifiers 5 and 6 are fed to a distributor 7 so as to be distributed into two groups of signals. Of these two groups of signals, one is fed to an output terminal 12, and the other is fed to an output terminal 14. To the output terminal 12, a VHF tuner (not shown) is connected; to the output terminal 14, an FM tuner (not shown) is connected.

Figure 9:
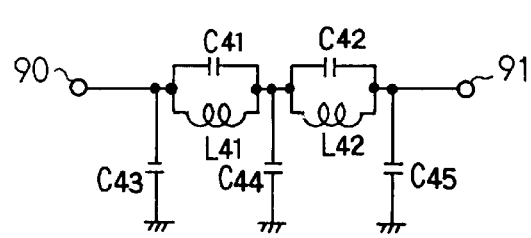
FIG. 9 is a circuit diagram of the low-pass filter used in the embodiments.

At an upstream signal input terminal 10, QPSK-modulated upstream signals are received, The upstream signals are then fed to an extraction circuit (duplexer) 16 composed of a low-pass filter that removes unnecessary signal components from the signals, and are then fed to the output terminal to which the signals output from the brancher (directional coupler) 2 in the through direction are fed. The upstream signals are then transferred, through the brancher 2, then via the CATV signal input terminal 1, and then across the cable, to the CATV station. The low-pass filter is composed of, for example as shown in FIG. 9, capacitors C41–45 and inductance coils L41 and L42 connected between an input terminal 90 and an output terminal 91.

Embodiment 2

Figure 2:
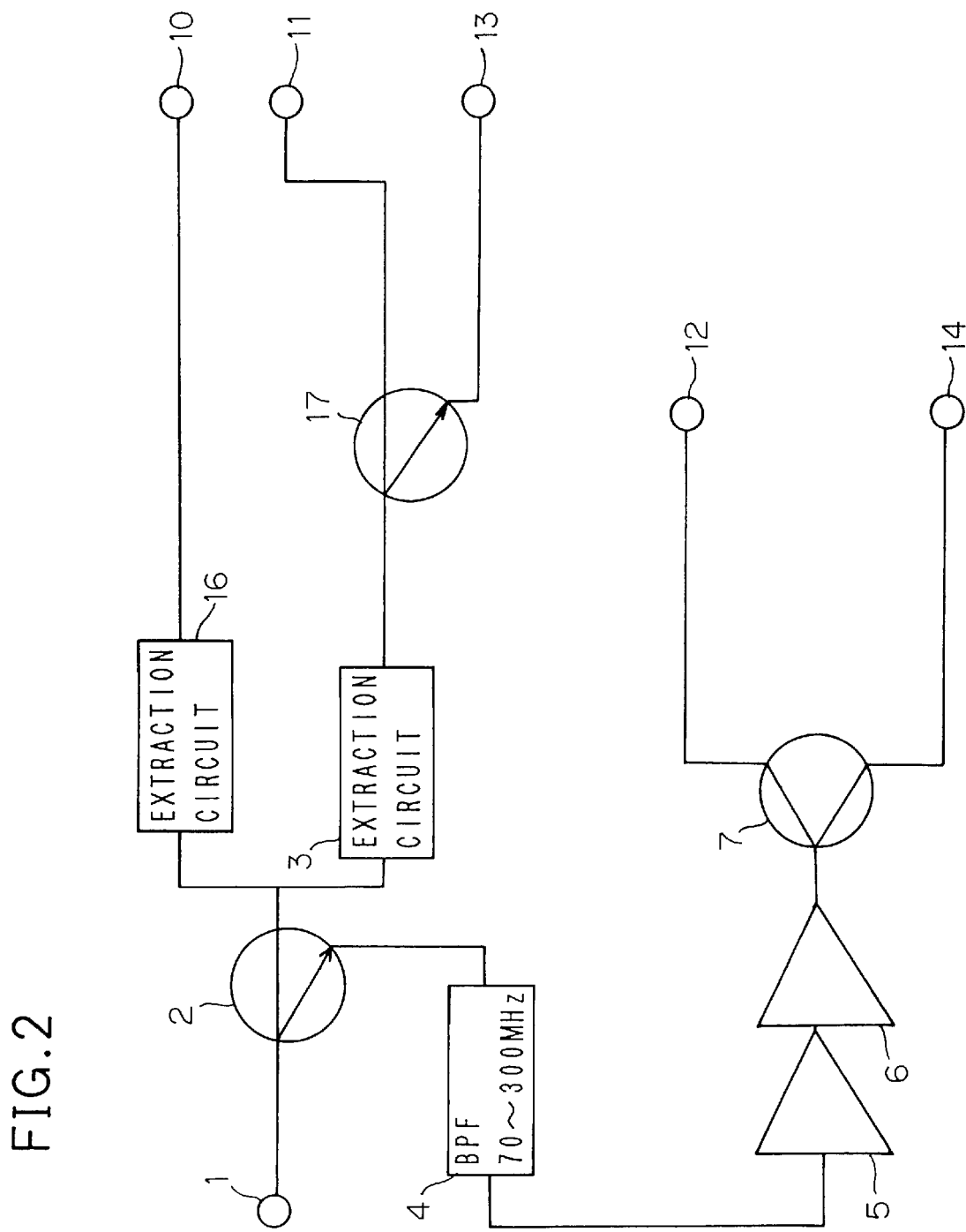
FIG. 2 is a block diagram of a second embodiment of the invention.

FIG. 2 is a block diagram of a second embodiment of the invention, Here, such circuit components as are found also in the first embodiment shown in FIG. 1 are identified with the same reference numerals and symbols. The second embodiment shown in FIG. 2 differs from the first embodiment shown in FIG. 1 in that, in the former, the distributor 15 used in the latter is replaced with a brancher (directional coupler) 17, and that the variable attenuator 8 and the wide-band amplifier 9 used in the latter are omitted.

Accordingly, the signals output from the extraction circuit 3 are fed directly to the brancher 17. The signals output from the brancher 17 in the through direction are fed as CATV signals to the output terminal 11, and the signals output from the brancher 17 in the branch direction are fed as downstream signals to the output terminal 13. In other respects, the circuit configuration of this embodiment is the same as that shown in FIG. 1.

In this circuit configuration, the CATV signals received at the CATV signal input terminal 1 are fed to the brancher 2. The signals output from the brancher 2 in the through direction are fed to the extraction circuit 3 that removes unnecessary signal components from the signals, and are then fed to the brancher 17. The signals that the brancher 17 outputs in the through direction and that thus suffer a smaller loss are fed to the output terminal 11, and the signals that the brancher 17 outputs in the branch direction are fed as downstream signals to the output terminal 13. Other signal handling, such as the distribution of VHF signals and FM signals and the reception and transfer of upstream signals, is performed in the same manner as in the embodiment shown in FIG. 1.

Embodiment 3

Figure 3:
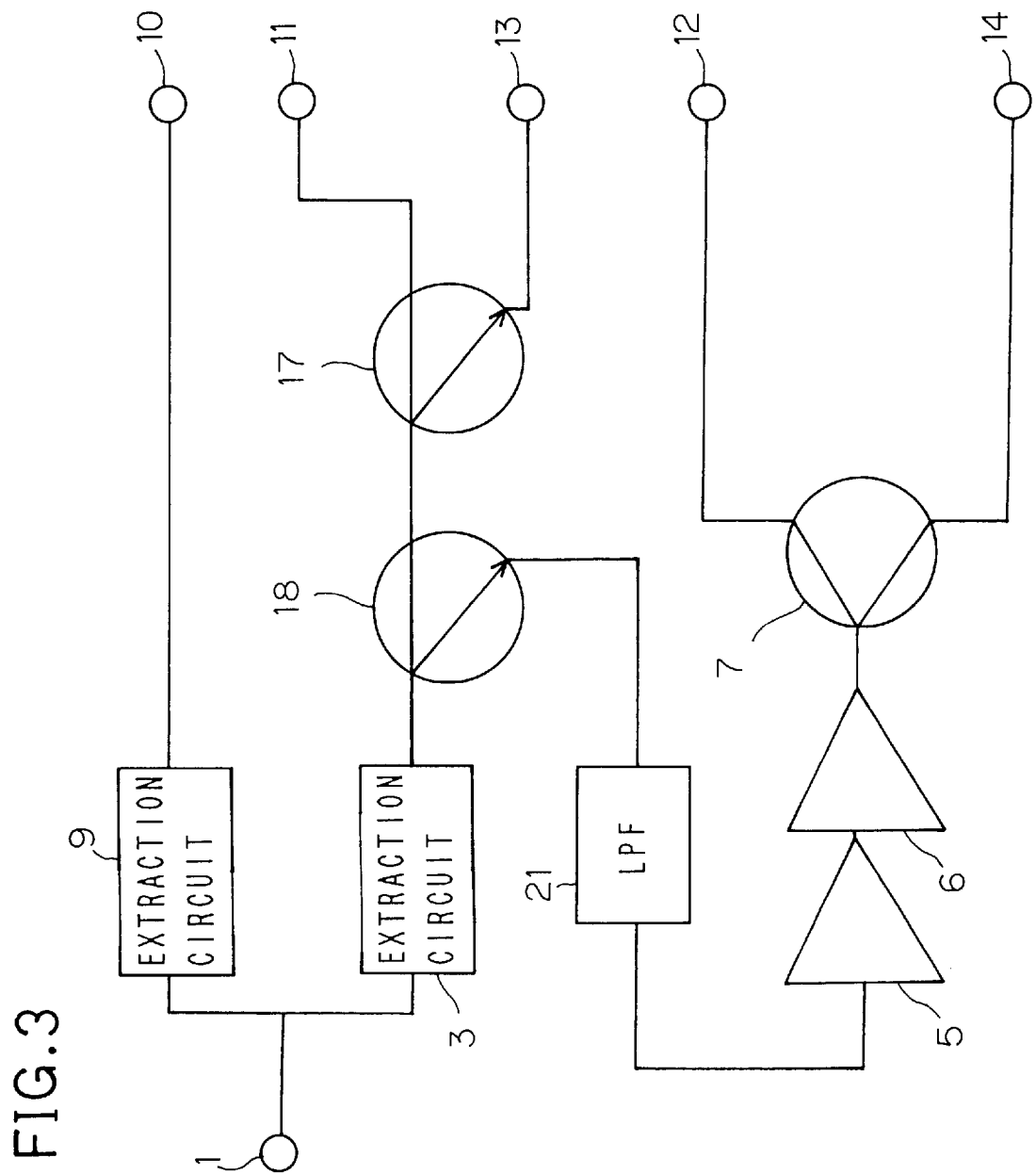
FIG. 3 is a block diagram of a third embodiment of the invention.

FIG. 3 is a block diagram of a third embodiment of the invention, Here, such circuit components as are found also in the second embodiment shown in FIG. 2 are identified with the same reference numerals and symbols. The third embodiment shown in FIG. 3 differs from the second embodiment shown in FIG. 2 in that, in the former, the brancher 2 used in the latter is provided as a brancher 18 between the extraction circuit 3 and the brancher 17, and that the band-pass filter 4 used in the latter is replaced with a LPF 21. In other respects, the circuit configuration of this embodiment is the same as that shown in FIG. 2.

Accordingly, the CATV signals transferred across a cable and received at the CATV signal input terminal 1 are first fed to the extraction circuit 3 composed of a HPF that removes unnecessary signal components from the signals, and are then fed to the brancher 18 so as to be distributed into signals that flow in the through direction and signals that flow in the branch direction. Here, the signals are distributed in such a way that the signals that flow in the through direction and thus suffer a smaller loss include CATV signals and downstream signals and the signals that flow in the branch direction and thus suffer a larger loss include VHF signals and FM signals.

The signals output from the brancher 18 in the through direction are then fed to the brancher 17 so as to be distributed into signals that that flow in the through direction and signals that flow in the branch direction. Here, the signals that flow in the through direction and thus suffer a smaller loss are fed as CATV signals to the output terminal 11, and the signals that flow in the branch direction and thus suffer a larger loss are fed as downstream signals to the output terminal 13. The signals output from the directional coupler (brancher) 18 in the branch direction are extracted through the LPF 21, and in this case these signals are as if extracted through a band-pass filter because of the presence of the HPF used in the extraction circuit 3. Other signal handling, such as the distribution of signals to the output terminal 12 and the output terminal 14 and the transfer of the upstream signals received at the upstream signal input terminal 10, is performed in the same manner as in the embodiment shown in FIG. 2.

Embodiment 4

Figure 4:
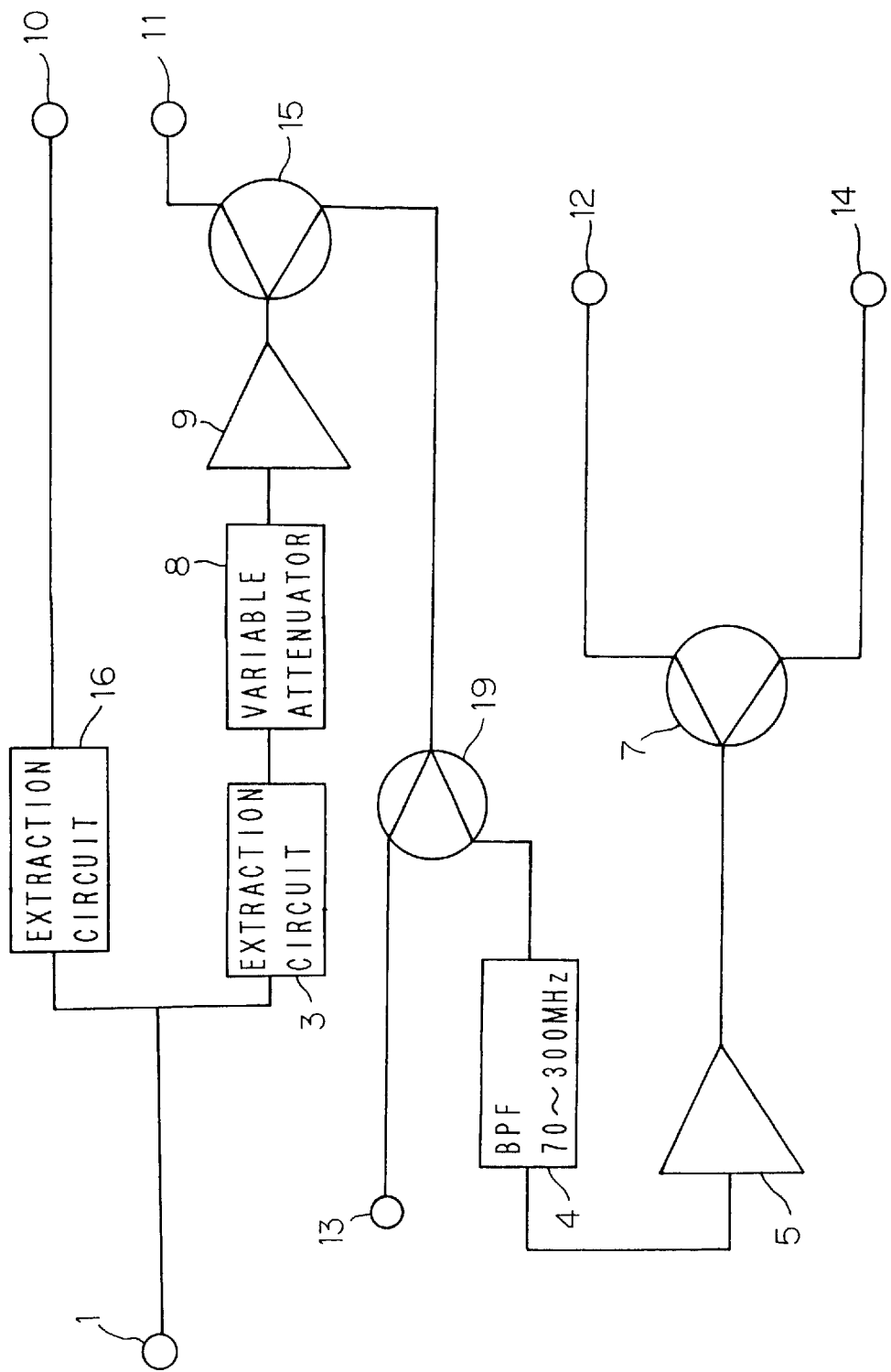
FIG. 4 is a block diagram of a fourth embodiment of the invention.

FIG. 4 is a block diagram of a fourth embodiment of the invention, Here, such circuit components as are found also in the first embodiment shown in FIG. 1 are identified with the same reference numerals and symbols. The fourth embodiment shown in FIG. 4 differs from the first embodiment shown in FIG. 1 in that, in the former, the brancher 2 used in the latter is removed and instead one of the two groups of signals output from the distributor 15 is distributed further into two groups of signals to obtain downstream signals, VHF signals, and FM signals. In other respects, the circuit configuration of this embodiment is the same as that shown in FIG. 1.

Accordingly, the CATV signals transferred across a cable and received at the CATV signal input terminal 1 are first fed to the extraction circuit 3 composed of a HPF that removes unnecessary signal components from the signals, and are then, as in the first embodiment, fed, through the variable attenuator 8 and the wide-band amplifier 9, to the distributor 15 so as to be distributed into two groups of signals. Of these two groups of signals output from the distributor 15, one is fed as CATV signals to the output terminal 11, and the other is fed to the distributor 19 so as to be distributed further into two groups of signals. Of these two groups of signals output from the distributor 19, one is fed as downstream signals to the output terminal 13.

The other output from the distributor 19 is, as in the first embodiment, fed, through the band-pass filter 4 and the wide-band amplifier 5, to the distributor 7 so as to be distributed further into two groups of signals. Of these two groups of signals output from the distributor 7, one is fed as VHF signals to the output terminal 12, and the other is fed as FM signals to the output terminal 14. The upstream signals received at the upstream signal input terminal 10 are first fed to the extraction circuit 16 composed of a LPF that removes unnecessary signal components from the signals, and are then transferred, via the CATV signal input terminal 1 and then across the cable, to the CATV station.

Embodiment 5

Figure 5:
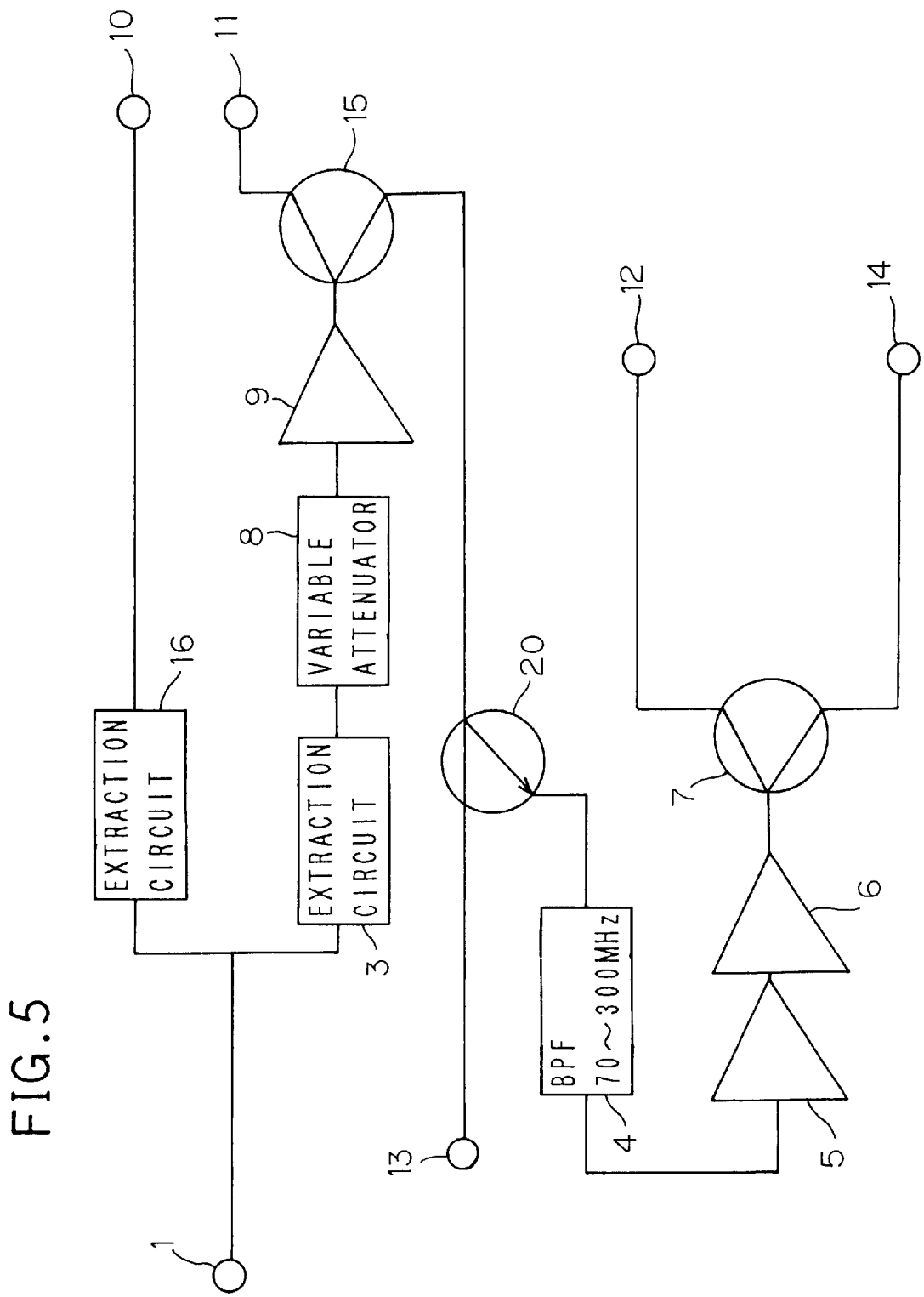
FIG. 5 is a block diagram of a fifth embodiment of the invention.

FIG. 5 is a block diagram of a fifth embodiment of the invention, Here, such circuit components as are found also in the fourth embodiment shown in FIG. 4 are identified with the same reference numerals and symbols. The fifth embodiment shown in FIG. 5 differs from the fourth embodiment shown in FIG. 4 in that, in the former, the distributor 19 used in the latter is replaced with a brancher 20. In other respects, the circuit configuration of this embodiment is the same as that shown in FIG. 4.

Accordingly, one of the two groups of signals output from the distributor 15 is fed as CATV signals to the output terminal 11, and the other is fed to the brancher 20. The signals that the brancher 20 outputs in the through direction are fed as downstream signals to the output terminal 13, and the signals that the brancher 20 outputs in the branch direction are, as in the first embodiment, distributed into two groups of signals, of which one is fed as VHF signals to the output terminal 12 and the other is fed as FM signals to the output terminal 14.

Embodiment 6

Figure 6:
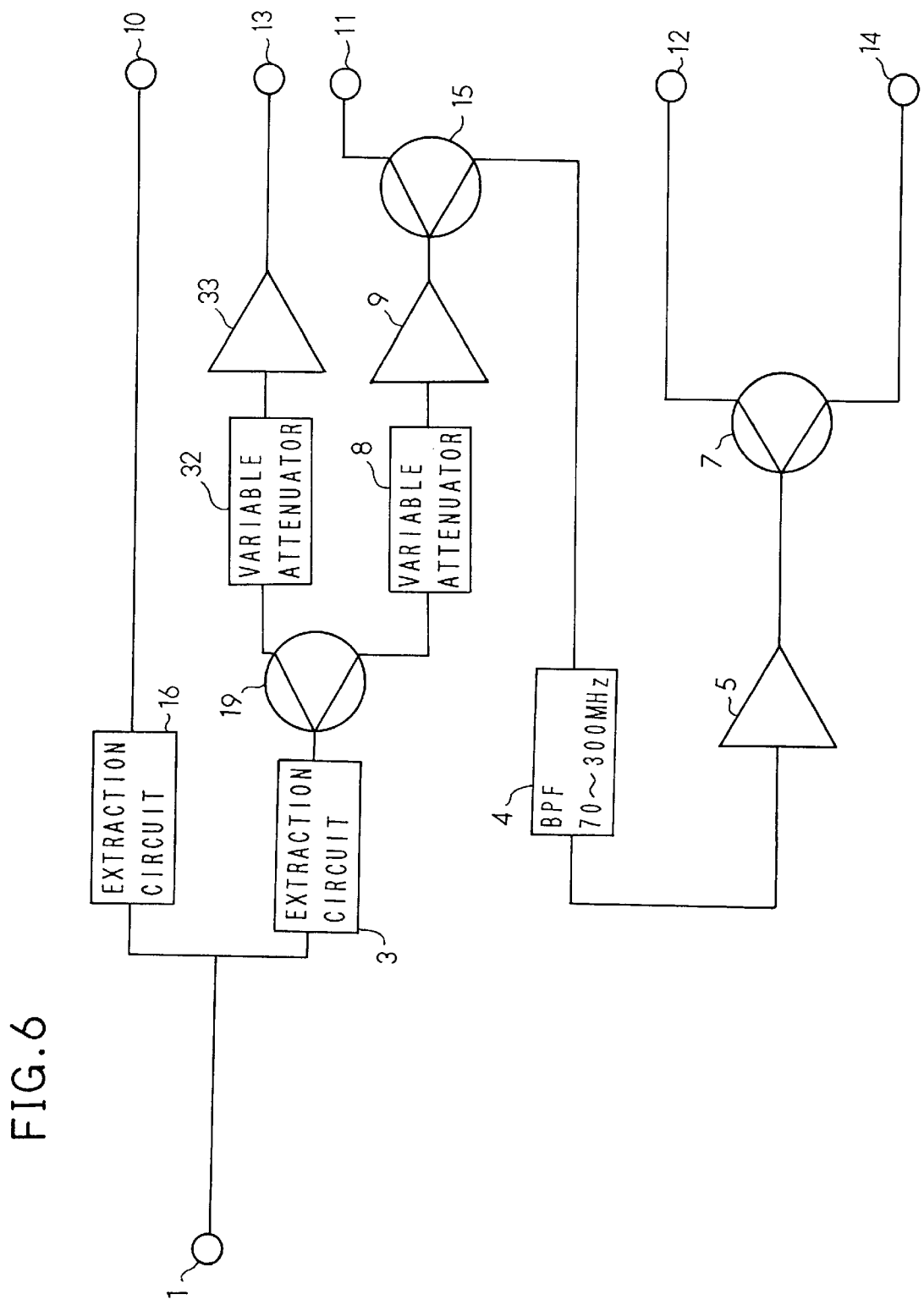
FIG. 6 is a block diagram of a sixth embodiment of the invention.

FIG. 6 is a block diagram of a sixth embodiment of the invention, Here, such circuit components as are found also in the fourth embodiment shown in FIG. 4 are identified with the same reference numerals and symbols. The sixth embodiment shown in FIG. 6 differs from the fourth embodiment shown in FIG. 4 in that, in the former, the distributor 19 used in the latter is provided between the extractor circuit 3 and the variable attenuator 8, and that one of the two groups of signals output from the distributor 19 is fed, through the variable attenuator 32 and the wide-band amplifier 33, to the data output terminal 13. The other output from the distributor 19 is fed, through the variable attenuator 8 and the wide-band amplifier 9, to the distributor 15. One of the two groups of signals output from this distributor 15 is fed directly to the BPF 4.

In this circuit configuration, the level of the CATV signals fed to the output terminal 11 and that of the data signals fed to the output terminal 13 can be adjusted separately. That is, for the processing circuits that are connected to the output terminals 11 and 13 respectively, the CATV signals need to have a higher level than the data signals, and this can be achieved by setting the CATV and data signals at different levels by the variable attenuators 32 and 8 respectively.

Although the circuits shown in FIGS. 7 to 13 have been described only in connection with the first embodiment, these circuits apply also to the second to sixth embodiments.

What is claimed is:

1. A signal distribution circuit for a CATV converter for distributing CATV signals into signals for an analog/digital tuner, signals for a downstream tuner, and other signals, comprising:

a directional coupler for distributing input CATV signals into signals that flow in a through direction and signals that flow in a branch direction;

an extraction circuit for permitting, out of the signals output from the directional coupler in the through direction, only the signals for an analog/digital tuner and the downstream signals to pass therethrough;

a gain control circuit for adjusting a gain of signals output from the extraction circuit;

a first output terminal for connection to an analog/digital tuner for receiving CATV signals;

a second output terminal for connection to a tuner for receiving downstream signals;

a distributor for distributing the signals of which the gain has been adjusted by the gain control circuit to the first and second output terminals; and a circuit for processing the signals output from the directional coupler in the branch direction.

2. A signal distribution circuit for a CATV converter for distributing cable television broadcast signals transferred across a cable into signals for an analog/digital tuner, signals for a downstream tuner, VHF signals, and FM signals, comprising:

a directional coupler for distributing input CATV signals into signals that flow in a through direction and signals that flow in a branch direction;

a first extraction circuit for permitting, out of the signals output from the directional coupler in the through direction, only signals having predetermined frequencies to pass therethrough;

a variable attenuator for variably attenuating signals output from the first extraction circuit;

a wide-band amplifier for amplifying signals output from the variable attenuator;

a first output terminal for connection to an analog/digital tuner for receiving CATV signals;

a second output terminal for connection to a tuner for receiving downstream signals;

a first distributor for distributing signals output from the wide-band amplifier to the first and second output terminals;

a filter for permitting, out of the signals output from the directional coupler in the branch direction, only VHF signals and FM signals to pass therethrough;

an amplifier for amplifying signals output from the filter; and a second distributor for distributing signals output from the amplifier into two groups of signals.

3. The signal distribution circuit as claimed in claim 2, further comprising:

an upstream signal input terminal; and a second extraction circuit for extracting input upstream signals and feeding them to an output end of a through-direction path of the direction coupler, wherein the directional coupler feeds the upstream signals to a CATV signal input terminal.

4. A signal distribution circuit for a CATV converter for distributing CATV signals into signals for an analog/digital tuner, signals for a downstream tuner, and other signals, comprising:

a first directional coupler for distributing input CATV signals into signals that flow in a through direction and signals that flow in a branch direction;

an extraction circuit for permitting, out of the signals output from the first directional coupler in the through direction, only the signals for an analog/digital tuner and the downstream signals to pass therethrough;

a first output terminal for connection to an analog/digital tuner for receiving CATV signals;

a second output terminal for connection to a tuner for receiving downstream signals; and a second directional coupler for distributing signals output from the extraction circuit into signals that flow in a through direction and signals that flow in a branch direction, and feeding the signals flowing in the through direction to the first output terminal and the signals flowing in the branch direction to the second output terminal.

5. A signal distribution circuit for a CATV converter for distributing cable television broadcast signals transferred across a cable into signals for an analog/digital tuner, signals for a downstream tuner, VHF signals, and FM signals, comprising:

a first directional coupler for distributing input CATV signals into signals that flow in a through direction and signals that flow in a branch direction;

a first extraction circuit for permitting, out of the signals output from the directional coupler in the through direction, only signals having predetermined frequencies to pass therethrough;

a first output terminal for connection to an analog/digital tuner for receiving CATV signals;

a second output terminal for connection to a tuner for receiving downstream signals;

a second directional coupler for distributing signals output from the first extraction circuit into signals that flow in a through direction and signals that flow in a branch direction, and feeding the signals flowing in the through direction to the first output terminal and the signals flowing in the branch direction to the second output terminal;

a filter for permitting, out of the signals output from the first directional coupler in the branch direction, only VHF signals and FM signals to pass therethrough;

a third output terminal for connection to a VHF tuner;

a fourth output terminal for connection to an FM tuner; and a distributor for distributing signals output from the filter to the third and fourth terminals.

6. The signal distribution circuit as claimed in claim 5, further comprising:

an upstream signal input terminal; and a second extraction circuit for feeding input upstream signals to a through-direction path of the first directional coupler.

7. A signal distribution circuit for a CATV converter for distributing cable television broadcast signals transferred across a cable into signals for an analog/digital tuner, signals for a downstream tuner, VHF signals, and FM signals, comprising:

a first extraction circuit for permitting, out of input CATV signals, only signals having predetermined frequencies to pass therethrough;

a first directional coupler for distributing signals output from the first extraction circuit into signals that flow in a through direction and signals that flow in a branch direction;

a first output terminal for connection to an analog/digital tuner for receiving CATV signals;

a second output terminal for connection to a tuner for receiving downstream signals;

a second directional coupler for distributing the signals output from the first directional coupler in the through direction into signals that flow in a through direction and signals that flow in a branch direction, and feeding the signals flowing in the through direction to the first output terminal and the signals flowing in the branch direction to the second output terminal;

a second extraction circuit for permitting, out of the signals output from the first directional coupler in the branch direction, only VHF signals and FM signals to pass therethrough;

a third output terminal for connection to a VHF tuner;

a fourth output terminal for connection to an FM tuner; and a distributor for distributing signals output from the second extraction circuit to the third and fourth terminals.

8. The signal distribution circuit as claimed in claim 7, further comprising:

an upstream signal input terminal; and a third extraction circuit for extracting input upstream signals and feeding them to a CATV signal input terminal.

9. A signal distribution circuit for a CATV converter for distributing cable television broadcast signals transferred across a cable into signals for an analog/digital tuner, signals for a downstream tuner, VHF signals, and FM signals, comprising:

a CATV signal input terminal;

a first extraction circuit for permitting, out of signals received at the CATV signal input terminal, CATV signals to pass therethrough;

a gain adjustment circuit for adjusting a level of signals output from the first extraction circuit to a predetermined level;

a wide-band amplifier for amplifying signals output from the gain adjustment circuit;

a first output terminal for connection to an analog/digital tuner for receiving CATV signals;

a second output terminal for connection to a tuner for receiving downstream signals;

a first distributor for distributing signals output from the wide-band amplifier into two groups of signals and feeding one of those two groups of signals to the first output terminal;

a filter for permitting only VHF signals and FM signals to pass therethrough;

a second distributor for distributing the other of the two groups of signals output from the first distributor to the second output terminal and the filter;

a third output terminal;

a fourth output terminal; and a third distributor for distributing signals output from the filter to the third and fourth output terminals.

10. The signal distribution circuit as claimed in claim 9, further comprising:

an upstream signal input terminal; and a second extraction circuit for feeding upstream signals received at the upstream signal input terminal to the CATV signal input terminal.

11. A signal distribution circuit for a CATV converter for distributing cable television broadcast signals transferred across a cable into signals for an analog/digital tuner, signals for a downstream tuner, VHF signals, and FM signals, comprising:

a CATV signal input terminal;

a first extraction circuit for permitting, out of signals received at the CATV signal input terminal, CATV signals to pass therethrough;

a variable attenuation circuit for performing automatic gain control on signals output from the first extraction circuit;

a wide-band amplifier for amplifying signals output from the variable attenuation circuit;

a first output terminal for connection to an analog/digital tuner for receiving CATV signals;

a second output terminal for connection to a tuner for receiving downstream signals;

a first distributor for distributing signals output from the wide-band amplifier into two groups of signals and feeding one of those two groups of signals to the first output terminal;

a filter for permitting only VHF signals and FM signals to pass therethrough;

a directional coupler for distributing the other of the two groups of signals output from the first distributor to the second output terminal and the filter;

a third output terminal;

a fourth output terminal; and a second distributor for distributing signals output from the filter to the third and fourth output terminals.

12. The signal distribution circuit as claimed in claim 11, further comprising:

an upstream signal input terminal; and a second extraction circuit for feeding upstream signals received at the upstream signal input terminal to the CATV signal input terminal.

13. A signal distribution circuit for a CATV converter for distributing cable television broadcast signals transferred across a cable into signals for an analog/digital tuner, signals for a downstream tuner, VHF signals, and FM signals, comprising:

a CATV signal input terminal;

a first extraction circuit for permitting, out of signals received at the CATV signal input terminal, CATV signals to pass therethrough;

a first output terminal for connection to an analog/digital tuner for receiving CATV signals;

a second output terminal for connection to a tuner for receiving downstream signals;

a first distributor for distributing signals output from the first extraction circuit into two groups of signals;

a first circuit for adjusting a gain of one of the groups of signals output from the first distributor and feeding those signals to the second output terminal;

a second circuit for adjusting a gain of the other of the groups of signals output from the first distributor;

a filter for permitting only VHF signals and FM signals to pass therethrough;

a second distributor for distributing signals output from the second circuit into two groups of signals and feeding one of those two groups of signals to the first output terminal and the other to the filter;

a third output terminal;

a fourth output terminal; and a third distributor for distributing signals output from the filter to the third and fourth output terminals.

14. The signal distribution circuit as claimed in claim 13, wherein the first and second circuits are each composed of a variable attenuator having an automatic gain control function and a wide-band amplifier.

15. The signal distribution circuit as claimed in claim 13, further comprising:

an upstream signal input terminal; and a second extraction circuit for feeding upstream signals received at the upstream signal input terminal to the CATV signal input terminal.

* * * * *